United States Patent
Monnier et al.

[11] Patent Number: 5,157,548
[45] Date of Patent: Oct. 20, 1992

[54] OPTICAL DEVICE DESIGNED FOR THE INTRODUCTION OF A COLLIMATED IMAGE INTO AN OBSERVER'S VISUAL FIELD AND ENBALING NIGHT VISION

[75] Inventors: Laurent Monnier, Bordeaux; Jean-Marc Kraus, Merignac; Jean-Noël Perbet, Eysines, all of France

[73] Assignee: Sextant Avionique, Meudon La Foret, France

[21] Appl. No.: 734,133

[22] Filed: Jul. 22, 1991

[30] Foreign Application Priority Data

Jul. 27, 1990 [FR] France ................... 90 09610

[51] Int. Cl.$^5$ .................. G02B 23/10; G02B 23/12; G02B 27/10
[52] U.S. Cl. .................... 359/630; 359/353; 359/351; 359/400; 359/419
[58] Field of Search ............... 359/409, 419, 420, 630, 359/632, 633, 634, 638, 353, 400

[56] References Cited

U.S. PATENT DOCUMENTS

| | | | |
|---|---|---|---|
| 3,464,757 | 9/1969 | Schmidt et al. | 359/400 |
| 3,509,344 | 4/1970 | Bouwers | 359/400 |
| 3,712,702 | 1/1973 | Schmidt | 359/419 |
| 4,193,666 | 3/1980 | Cojan | 359/630 |
| 4,260,217 | 4/1981 | Tracqer et al. | 359/353 |
| 4,465,347 | 8/1984 | Task et al. | 359/400 |
| 4,629,295 | 12/1986 | Vogl | 359/400 |
| 4,653,879 | 3/1987 | Filipovich | 359/400 |
| 4,818,065 | 4/1989 | Ziph et al. | 359/630 |
| 4,915,487 | 4/1990 | Riddell et al. | 359/630 |
| 4,993,819 | 2/1991 | Moorhouse | 359/419 |

FOREIGN PATENT DOCUMENTS 0206324 12/1986 European Pat. Off.
0381449 8/1990 European Pat. Off.
0403342 12/1990 European Pat. Off.
2622284 4/1989 France.

OTHER PUBLICATIONS

Optical Engineering, vol. 23, May–Jun. 1984, pp. 331–333, Jamieson, "Channel Interaction in an Optical Fire Control Sight".

*Primary Examiner*—Jon W. Henry
*Attorney, Agent, or Firm*—Oblon, Spivak, McClelland, Maier & Neustadt

[57] ABSTRACT

The disclosure relates to optical devices enabling daytime vision and night vision of an external scene with, in both cases, the superimposed introduction, into an observer's visual field, of an image given by an image generator. The image given by the light intensifier of a night observation system is processed in the same way as the image given by the image generator, by an auxiliary image-combining optical system which mixes these two images before they reach the main image-combining optical system of the device through which, in night vision, the observer directly sees the external scene. The auxiliary image-combining optical system is designed so that, in night vision, at least the greatest part of the light coming from the image generator reaches the main image-combining optical system. Depending on the embodiment, this result is obtained either with a retractable semi-reflecting mirror or with a semi-reflecting surface selective in frequency.

5 Claims, 2 Drawing Sheets

5,157,548

OPTICAL DEVICE DESIGNED FOR THE INTRODUCTION OF A COLLIMATED IMAGE INTO AN OBSERVER'S VISUAL FIELD AND ENBALING NIGHT VISION

BACKGROUND OF THE INVENTION

The present invention concerns an optical device that can be used for daytime vision and night vision and that enables the introduction of a superimposed collimated image into an observer's visual field.

There is a known way of using an optical combiner to introduce, into an observer's visual field, a superimposed collimated image that would, for example, give a pilot information on the flight parameters of his aircraft. The image-combining optical system used for this purpose is placed in front of the observer's eye and enables him to see the external view, generally by transparency through an optical unit, and to see the collimated image by means of an optical path comprising reflections within the optical unit. An optical device made in this way, when mounted in a helmet, constitutes what is called a helmet display unit. There is also a known way of carrying out a night observation with a helmet display unit comprising an optical night observation system followed by a light intensifier: the image given by the intensifier is combined with the collimated image by means of an auxiliary image-combining optical system of the semi-reflecting mirror type before reaching a main image-combining optical system that is placed in front of the pilot's eye and enables him to see the external view by transparency, as well as the collimated image and the intensifier image.

The auxiliary image-combining optical system gives great preference to the optical channel coming from the intensifier to the detriment of the optical channel proper to the collimated image. To prevent the optical image, in daytime vision, from being poorly visible owing to the attenuation due to the auxiliary image-combining optical system, and owing to the luminosity of the view of the external scene, the means enabling night vision are not mounted on the helmet when they are used. This results in assembling and dismantling operations that make it very inconvenient to change from daytime vision to night vision and vice versa.

SUMMARY OF THE INVENTION

The present invention is aimed at circumventing or, at least, at reducing these drawbacks. This result is obtained by the use of one and the same inventive concept, namely the concept of an auxiliary image-combining optical system such that, in night vision, at least the greatest part of the light designed to give the collimated image reaches the main image-combining optical system. This concept has led to two embodiments: one in which the auxiliary image-combining optical system gets retracted in daytime vision and another in which the auxiliary image-combining optical system is selective in frequency so as to give preference to the optical channel coming from the intensifier only in the band corresponding to the wavelengths of the signals of the intensifier.

According to the present invention, there is provided an optical device for daytime vision and night vision, having a first, second and third optical channel, all three of these channels being designed to reach the eye of an observer, the first channel comprising, in series, a night observation optical system, a light intensifier, an auxiliary image-combining optical system constituted by a retractable mirror, and a main image-combining optical system; the second channel comprising an image generator, an optical collimation system to give a collimated image, the auxiliary image-combining optical system and the main image-combining optical system; and the third channel comprising the main image-combining optical system and being designed to enable an observer to look at what is normally in his field of vision.

According to the present invention, there is further provided an optical device for daytime vision and night vision, having a first, second and third optical channel, all three of these channels being designed to reach the eye of an observer, the first channel comprising, in series, a night observation optical system, a light intensifier, an auxiliary image-combining optical system having a surface that has undergone a treatment to make it selective in frequency, and a main image-combining optical system; the second channel comprising an image generator, an optical collimation system to give a collimated image, the auxiliary image-combining optical system and the main image-combining optical system; and the third channel comprising the main image-combining optical system and being designed to enable an observer to look at what is normally in his field of vision.

BRIEF DESCRIPTION OF THE DRAWINGS

The present invention will be understood more clearly, and other characteristics will appear from the following description and from the appended figures, of which.

In the figures, the corresponding elements are designated by the same references.

MORE DETAILED DESCRIPTION

Some technical facts recalled here below will provide for a clearer understanding of the invention if need be.

Optical devices such as, for example, helmet display units, work as follows: the elements of information to be transmitted to the user are produced by a light image generator, for example on a cathode ray tube screen or on a matrix screen; the image thus formed is taken into account by an optical system that enables the user to see the external scene and, in superimposition, the image that has been previously collimated to infinity so that it is sharp when the user looks and adjusts to long distance.

Night vision systems include, in series, a first optical unit that forms an image of the external scene with very low luminosity, an image intensifier tube that receives the image formed by the first optical unit and amplifies its luminance, and a second optical unit that receives the luminance-amplified image and collimates it to infinity in order to make the observation of the image agreeable from a physiological point of view, namely as regards the convergence and ajustment of the eyes.

The image given, in a helmet display unit, by the image generator to the optical collimation system has roughly the same size as the images given, in night vision binoculars, by each of the two light intensifiers to the output optical unit to which it is coupled. This similarity of size facilitates the making of the devices according to FIGS. 1 to 3, where the combination of the images from the image generator and from the night vision system is done as soon as these images are produced, by means of an image-combining optical system.

Figure 1:
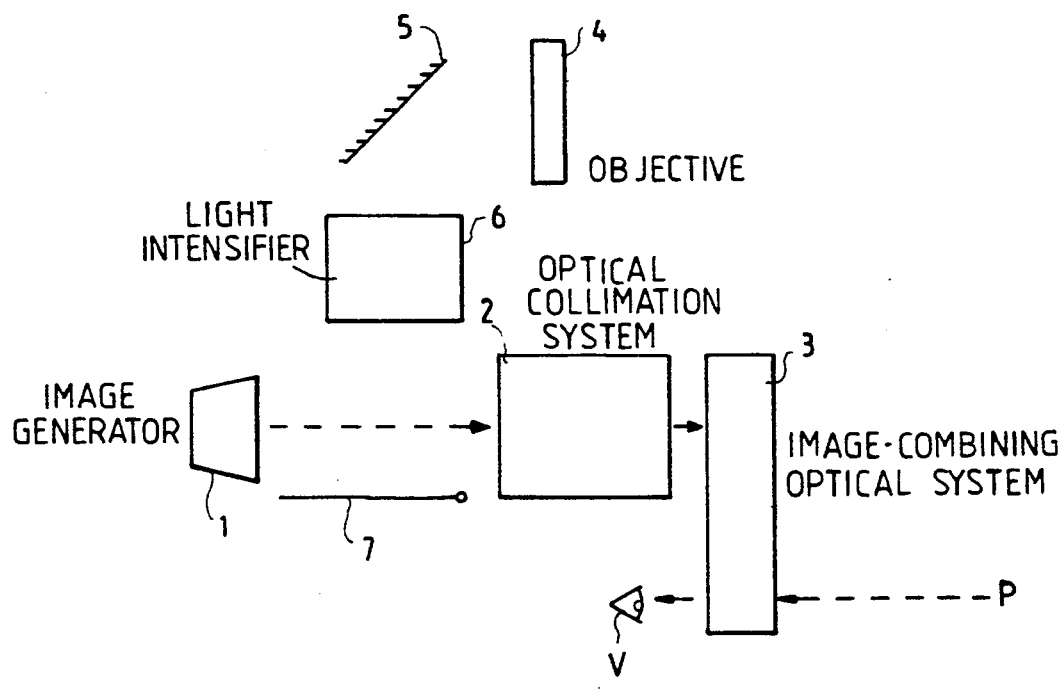
FIGS. 1 and 2 show two drawings of one and the same optical device according to the invention.
Figure 2:
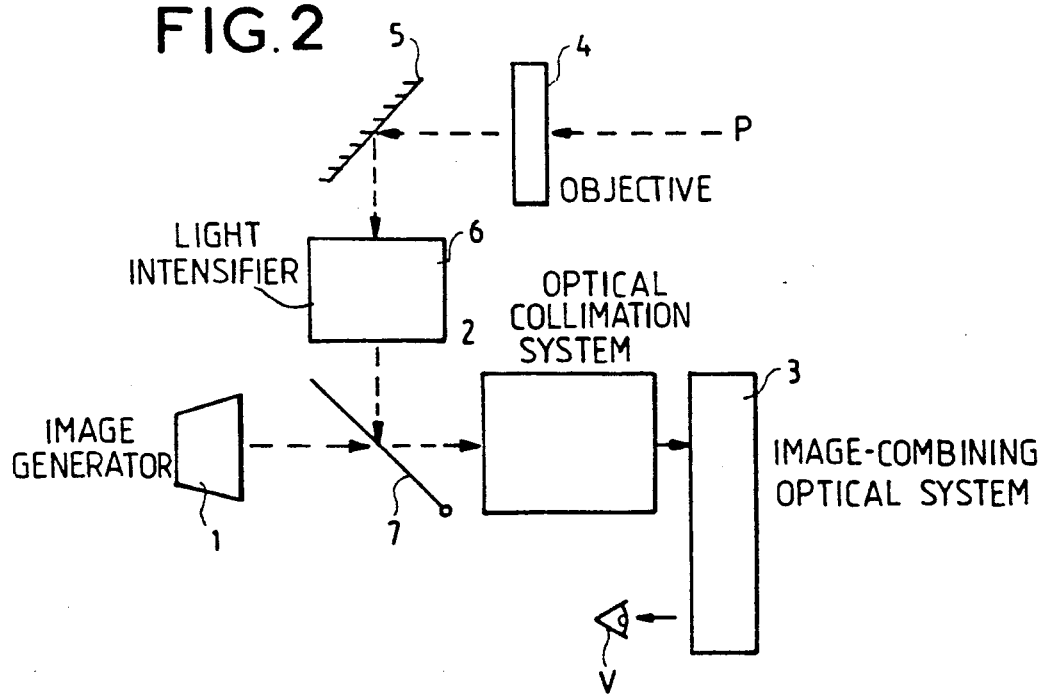

FIGS. 1 and 2 show a device according to the invention, respectively in a daytime and night observation position. The device has an image generator 1. The images produced by the image generator 1 are collimated at infinity by an optical collimation system 2, to be transmitted to the eye V of an observer by means of an image-combining optical system 3, through which the observer can also directly see the external view, P, at least when the conditions of illumination allow it.

When the conditions of illumination no longer allow sufficiently clear vision of the external scene, directly through the image-combining optical system 3, a retractable semi-reflecting mirror 7 is interposed at 45 degrees in the optical path between the image generator 1 and the optical collimation system 2. When this mirror is placed in a night position, namely as in FIG. 2, it acts as an image-combining optical system: it lets the light rays, coming from the image generator 1, pass through towards the optical collimation system 2 and reflects the light rays coming from a unit designed for night vision towards the optical collimation system 2. The unit designed for night vision comprises an optical observation system 4, 5 followed by a light intensifier 6; the optical observation system is constituted by an objective 4 and a reflecting mirror 5 which forms an image of the external scene on the light intensifier 6, and this intensifier amplifies the luminance of this image. The light rays corresponding to this amplified image are sent towards the retractable semi-reflecting mirror 7.

In daytime use, i.e. according to FIG. 1, the maximum amount of light flux is sent from the image generator towards the optical collimation system 2 enabling the collimation of the image coming from the generator 1 and the mixing of this image with the view that the observer has of the external scene P, directly through the image-combining optical system 3.

The retractable semi-reflecting mirror 7, in the example described, has a reflection coefficient of 95% and a transmission coefficient of 5%. This makes it possible, in night time use, namely according to FIG. 2, to favor the transmission of the image given by the light intensifier; the luminance of this image is low since it is generally a luminance of only a few candelas per square meter while that of the image given by the generator may be adjusted to the desired level so that the information contained by it can be clearly seen by the observer.

While it is true that the mechanical system, not shown in FIGS. 1 and 2, entailed by the use of this retractable mixer increases the bulk and the weight of the device, it is justified by its technical simplicity. It is similar to that of the retractable mirrors of reflex cameras.

In the case of the example described, this mechanical system is hand-operated. It is the observer himself who positions the semireflecting mirror when he wishes to use the device in a night vision mode, and the return to the daytime position is done semi-automatically by means of a spring tensed during the positioning of the mirror.

The mirror 7 may also be motor-driven in order to obtain the tilting of the mirror as soon as the image intensifier is put under voltage, or upon activation by the observer.

Figure 3:
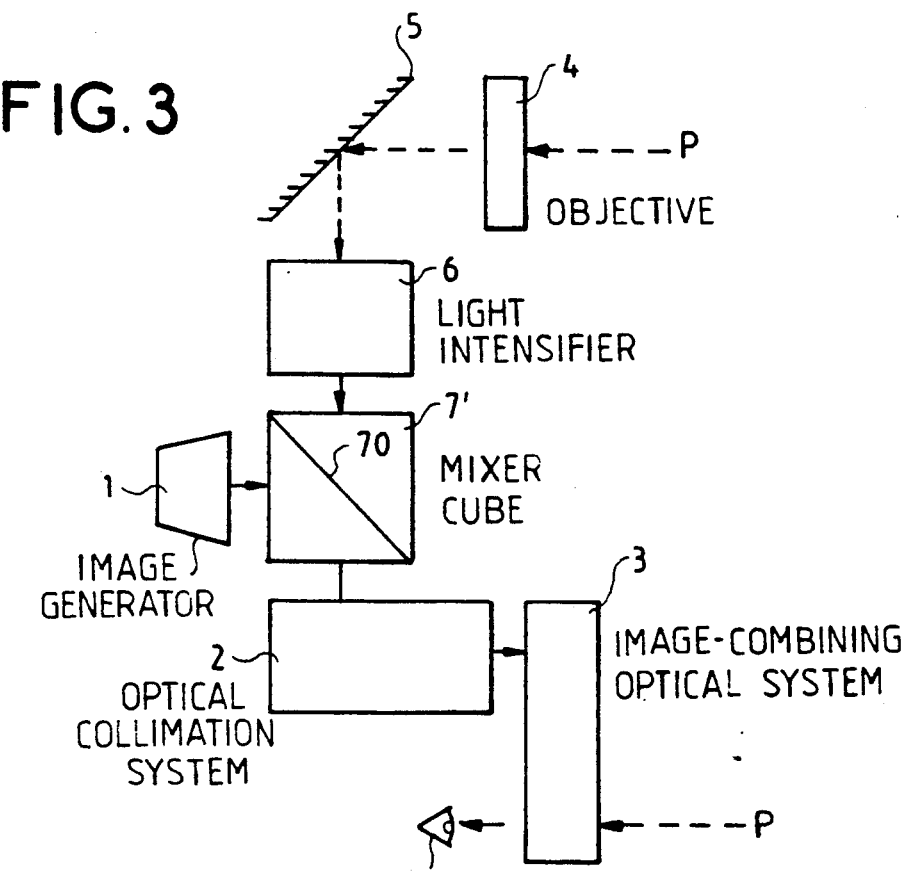
FIG. 3 shows a drawing of another optical device according to the invention.

FIG. 3 shows another device according to the invention, which is distinguished from the device according to FIGS. 1 and 2 by the fact that the role of an image-combining optical system, which was fulfilled by the mirror 7, is now fulfilled by a mixer cube 7'. The device according to FIG. 3 has the same elements 1 to 6 as the device according to FIGS. 1 and 2. However, contrary to the mirror 7, the mixer cube 7' works in transmission for the light coming from the light intensifier 6 and in reflection for the light coming from the image generator 1, so much so that the optical collimation system 2 is distinguished from that of FIGS. 1 and 2 by its layout in the device and by the position of its input in relation to its output.

Figure 4:
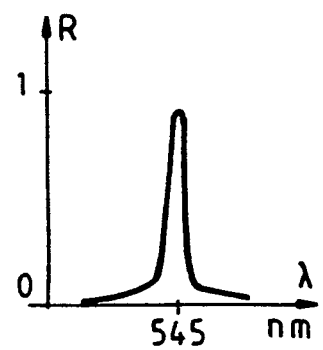

The mixer cube 7' is a dichroic cube in the example described, i.e. it is constituted by two attached prisms, the facing sides of which are treated to constitute a surface 70, that is reflective around a given wavelength of light, taken herein as being equal to 545 nanometers. A holographic treatment of the facing sides of the prisms would have given the same result. FIG. 4 shows how the reflection coefficient R of the surface 70 varies as a function of the wavelength $\lambda$ of the light; the value of the coefficient of transmission T of the surface 70 is easily deduced from the curve according to FIG. 4, given that $R+T=1$.

Figure 5:
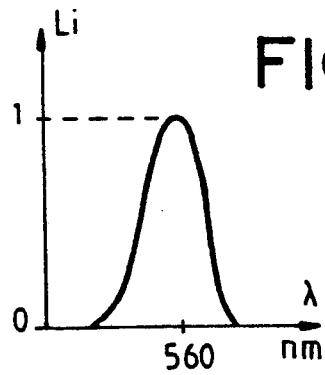
FIGS. 4 to 8 are curves representing characteristics of elements of the optical device according to FIG. 3.

As in the majority of present light amplifiers., the luminophors used in the light intensifier 6 are P20 luminophors for which the luminance curve, as a function of the wavelength in nanometers, is shown in FIG. 5; this curve represents the luminance, Li, with values ranging from 0 to 1, the value 1 being reached for the wavelength of 560 nanometers which corresponds to the maximum energy transmitted by the luminophor P20. The width of the spectral band of the luminophor P20 is 150 nanometers for the value 0.2 of the luminance.

Figure 6:
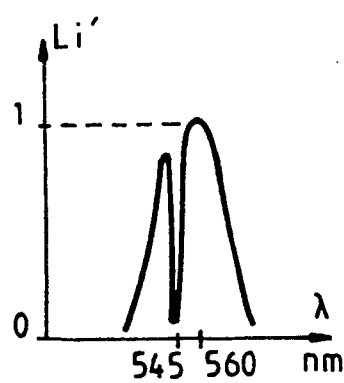

Given the curves according to FIGS. 4 and 5, the curve of the luminance Li', corresponding to the light that comes from the light intensifier and reaches the optical collimation system 2 after having gone through the surface 70 of the cube 7', takes the form shown in FIG. 6, as a function of the wavelength. Since the spectral band of the luminophor P20 is relatively wide, the energy loss resulting, at 545 nanometers, from the crossing of the surface 70, is low and has no marked effect on the quality of the image delivered by the light intensifier 6.

Figure 7:
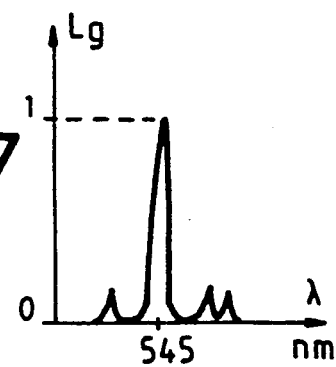

The image generator 1 of the device according to FIG. 3 uses luminophors P43 which are narrow band luminophors centered on 545 nanometers. The curve of the luminance Lg of these luminophors as a function of the wavelength is shown in FIG. 7.

Figure 8:
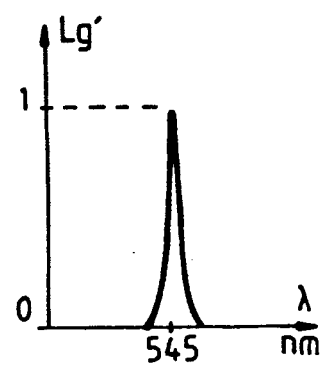

Given the curves according to FIGS. 4 and 6, the curve of the luminance Lg', corresponding to the light that comes from the image generator 1 and reaches the optical collimation system 2 after reflection on the surface 70 of the cube 7', takes the form shown in FIG. 8 as a function of the wavelength, i.e. almost all the light energy coming from the image generator 1 is reflected towards the optical collimation system 2.

It must be noted that the device according to FIG. 3 works with wideband light sources in the light intensifier channel and with narrow band light sources in the image generator channel. It is also possible to make it work with narrow band light sources in the light intensifier channel and with wideband light sources in the channel of the image generator, or with sources having narrow bands, but bands that are distinct in the two channels. It is enough to chose the treatment of the surface 70 of the cube as a function of the frequency bands to be reflected and transmitted.

The present invention relates especially to the helmet display units used by aircraft and helicopter pilots.

What is claimed is:

1. An optical device for daytime vision and night vision, having a first, second and third optical channel, all three of these channels being designed to reach the eye of an observer, the first channel comprising, in series, a night observation optical system, a light intensifier, an auxiliary image-combining optical system constituted by a retractable mirror, a main image-combining optical system, the second channel comprising an image generator, an optical collimation system to give a collimated image, the auxiliary image-combining optical system for mixing with the first channel and the main image-combining optical system, and the third channel comprising the main image-combining optical system and being designed for daytime vision to enable an observer to look at what is normally in his field of vision.

2. An optical device for daytime vision and night vision, having a first, second and third optical channel, all three of these channels being designed to reach the eye of an observer, the first channel comprising, in series, a night observation optical system, a light intensifier, an auxiliary image-combining optical system having a surface that has undergone a treatment to make it selective in frequency, a main image-combining optical system, the second channel comprising an image generator, an optical collimation system to give a collimated image, the auxiliary image-combining optical system for mixing with the first channel and the main image-combining optical system, and the third channel comprising the main image-combining optical system and being designed for daytime vision to enable an observer to look at what is normally in his field of vision.

3. An optical device for daytime vision and night vision, comprising:
 a first channel for night vision and for generating a first channel signal to be viewed by a viewer comprising:
  a night observation optical system for receiving a first input signal;
  a light intensifier for intensifying said first input signal;
  an auxiliary image-combining optical system; and
  a main image-combining optical system;
 a second channel for generating a second channel signal to be viewed by the viewer comprising:
  an image generator for generating a second input signal;
  an optical collimation system to generate a collimated image of the second input signal;
  an auxiliary image-combining optical system for mixing signals output from said first and second channels; and
  the main image-combining optical system;
 a third channel for daytime vision for generating a third channel signal to be viewed by the viewer comprising the main image-combining optical system and being designed to enable an observer to look at what is normally in his field of vision.

4. The optical device according to claim 3, wherein the auxiliary image-combining optical system comprises a retractable mirror.

5. The optical device according to claim 1, wherein the auxiliary image-combining optical system comprises a dichroic cube.

* * * * *